(12) United States Patent
Gilbert (10) Patent No.: US 7,137,122 B2
(45) Date of Patent: Nov. 14, 2006

(54) METHODS AND APPARATUS FOR REGULATING PROCESS STATE CONTROL MESSAGES

(75) Inventor: David Alan Gilbert, Manchester (GB)

(73) Assignee: Xyratex Technology Limited, Havant Hampshire (GB)

( * ) Notice: Subject to any disclaimer, the term of this patent is extended or adjusted under 35 U.S.C. 154(b) by 779 days.

(21) Appl. No.: 09/858,934

(22) Filed: May 16, 2001

(65) Prior Publication Data
US 2002/0065865 A1   May 30, 2002

(30) Foreign Application Priority Data
Oct. 18, 2000 (GB) ................................ 0025490.4

(51) Int. Cl.
| | |
|---|---|
| G06F 15/16 | (2006.01) |
| G06F 3/00 | (2006.01) |
| G06F 9/44 | (2006.01) |
| G06F 9/46 | (2006.01) |
| G06F 13/00 | (2006.01) |
| H04L 12/28 | (2006.01) |

(52) U.S. Cl. ............... 719/314; 709/206; 709/207; 719/314; 370/392

(58) Field of Classification Search ............... None
See application file for complete search history.

(56) References Cited

U.S. PATENT DOCUMENTS 6,032,188 A * 2/2000 Mairs et al. ............... 709/234
6,157,967 A * 12/2000 Horst et al. ................ 710/19
6,721,273 B1 * 4/2004 Lyon .......................... 370/235

FOREIGN PATENT DOCUMENTS

| JP | 2149152 A | 6/1990 |
|---|---|---|
| JP | 2000069055 A | 3/2000 |
| JP | 2000101676 A | 4/2000 |
| WO | WO 95/16967 A1 | 6/1995 |
| WO | WO 0038375 | 6/2000 |

OTHER PUBLICATIONS

Tiao, W. Amos, "Modeling the Buffer Allocation Strategies and Flow Control Schemes in ATM Networks," Jun. 1997, IEEE, pp. 38-42.*
Choe, Myongsu and Tropper, Carl, "Flow Control and Dynamic Load Balancing in Time Warp," Apr. 2000, IEEE, pp. 219-226.*

* cited by examiner

*Primary Examiner*—Jason Cardone
*Assistant Examiner*—Azizul Choudhury
(74) *Attorney, Agent, or Firm*—Bracewell & Giuliani LLP (57) ABSTRACT

In a data processing system, the flow of messages specifying the states of various processes in the system, is regulated using a first register which maintains a list of the current states of each process, and a queue. Whenever a process state message relating to a particular process arrives, the new state of that process is written into the current state register, and an item is placed in a queue. The item indicates the identity of the process concerned. When the item reaches the front of the queue, the current state of the process it identifies is read from the current state register and used to generate an output message. Flags can be used to reduce the redundancy of items in the queue and limit its size. The queue can be modified to cope with messages of differing priorities. To reduce memory requirements, the processes may be grouped into sets, so that each queue item relates to a set of processes.

19 Claims, 2 Drawing Sheets

METHODS AND APPARATUS FOR REGULATING PROCESS STATE CONTROL MESSAGES

FIELD OF THE INVENTION

The present invention relates to method and apparatus for regulating the flow within a data processing system (for example of the type disclosed in International patent application WO 00/38375, the disclosure of which is incorporated herein by reference) of messages indicating the states of the processors within the system. In particular, the methods may be used by an interface which transfers packets of data from a network processor to the input queues of a router, for regulating the flow to the network processor of messages indicating the occupancy state of each of the queues of the switch fabric port.

BACKGROUND OF THE INVENTION

It is known to control the operation of multiple processors using 'process state control messages'—that is, messages flowing between processors and comprising data identifying a particular processor and describing the state of a process associated with that processor. For example, each processor may be associated with an input queue (e.g. defined by a router device) and be arranged to receive data packets after they reach the front of the queue (e.g. pass into a data switch in the router device which interconnects the input queues to the processors). In this case, the 'process state control message' is referred to as a 'flow control message', and indicates the state of the input queue for that processor. The current state data may be a 4 level indicator specifying that the queue is in one of the four states 'empty', 'filling up', 'nearly full', and 'very full'; however in other implementations the data indicates one of only two states ('empty' and 'very full'). In an example of particular relevance to the present application, a data processing system may be of the kind disclosed in WO 00/38375 including two processors: a first processor which is a network processor generating data packets and the other processor being an input port administration processor creating flow control messages to which the network processor is required to respond.

Flow control messages can be generated from any queue (e.g. by an input device which implements that queue), and in any order. In many systems, multiple messages can be sent from each queue, as it moves between states an unrestricted number of times.

The importance of minimizing the time taken to deliver a given flow control message to its destination varies according to the state which the message indicates. For example, a flow control message carrying an 'empty' notification is signalling to the recipient of the message, e.g. the network processor, that the network processor is free to send data to the queue which is the subject of the message; a delay in the transmission of such a message merely results in a loss of efficiency since the network processor may have traffic to deliver but is unable to do so. However, if the flow control message contains a 'very full' notification, this means that the network processor must not send any more data for this queue, since there is no more room to store it. Accordingly a 'very full' notification may be considered as more important than an 'empty' notification.

Accordingly, one might contemplate prioritizing status updates. If so, however, there are some rules that must be obeyed. Consider the sequence 'very full', 'empty', 'very full' relating to the same queue. Simply reordering the messages according to their respective priorities would create the sequence 'very full', 'very full', 'empty'. This would be invalid since the result at the end of the sequence is different from last known state of the queue. On the other hand, assuming that none of the messages has already been transmitted, just transmitting 'very full' (the latest known state) would be valid since it brings the network processor up to date with the current state of the queue.

SUMMARY OF THE INVENTION

The present invention seeks to provide new and useful methods and apparatus for regulating the flow of process state messages, that is messages indicating the state of processes in a data processing system.

In its most general terms the present invention proposes that a regulator for process state messages comprises a first register ("current state register") which maintains a list of the current states of each of the processes, and a queue. Whenever a process state message relating to a particular process arrives, the new state of that process is written into the current state register, and an item is placed in a queue. The item indicates the identity of the process concerned. When the item reaches the front of the queue, the current state of the process it identifies is read from the current state register and used to generate an output message.

Note that if, while this item was waiting in the queue, a second process state message arrives indicating that the state of the same processor has changed, then this second process state message will update the current state register, so that the output message generated when the item reaches the front of the queue will carry the state of the processor as indicated by the second process state message rather than the first. In other words, this arrangement ensures that the output signals of the regulator carry the latest information on the states of the processes.

Preferably, a separate queue is maintained for each of a number of priority levels associated with possible states of the processes, e.g. with one priority level for each of the possible states of the processes, with "very full" having top priority. An item generated from a flow control message specifying a certain process state is placed in the queue of corresponding priority. Output messages are always generated based on the item at the front of the queue of highest priority.

The regulator further maintains a second "pending flag" register indicating for each process (and each priority level, if there is more than one) the item or items which are waiting in the queue(s). Specifically, there is a "flag" for each process and priority level, and the flag is "set" to indicate the existence of an item in the queues, and "reset" when that item is removed. If pending flag register indicates that the queue already contains an item for a given process or set of processes at the same priority level or a higher one, then it is unnecessary to generate a queue item for that process (or set of processes). In other words, this pending flag register can be used to limit the number of items which are fed into the queues, and ensure that the queues do not overflow. To keep the pending flag register up to date, it should be updated whenever an item is inserted into a queue, and whenever an item is read from the front of a queue.

To save space in the queues and pending flag register, the processes may be divided into a number of predetermined sets, each set containing one or more processes. Then the item which is inserted into the queue based on a process state message designating a certain process, needs only indicate the set of processes to which that process belongs. The output process state signal will carry the states (taken from the current state register) of each of the processes in the set. This concept of dividing the processes into sets also results in there being fewer output messages in total (e.g. two input flow control messages having the same priority and relating to processes in the same set, will often only result in the generation of a single output message).

Accordingly, a first expression of the invention is a mechanism for handling process state control messages flowing between processors in a data processing system, each message comprising a process identity and a process state value indicative of the urgency or priority rating applied to the process, characterised in that the interface between the processors includes (a) a process message address queue, operated as a first-in-first-out store and having at least Q elements where Q equals the number of processes to be handled by the mechanism and in which each element stores a process identity, (b) a current state random access memory having Q addressable locations, one for each process, and (c) a process pending flag memory having Q addressable locations, one for each process, in which in operation process state control messages arriving at the mechanism are segregated into process identity and process state sections, the process state section being written into the current state random access memory at the location addressed by the process identity and if the corresponding process pending flag is reset that flag is set and the process identity is fed into the process message address queue.

When a process identity is retrieved from the process message address queue the process message is reconstituted using the retrieved process identity and the process state as stored in the corresponding current state random access memory location and the corresponding pending flag is reset in the process pending flag memory Within the terms of this expression of the invention, an optional feature is that, in order to prioritize some process state values, a plurality of process message address queues may be provided with a corresponding plurality of pending flag memories the process identity of a received process state control message being written into the process message address queue appropriate to the process state as well as setting the corresponding pending flag in the appropriate pending flag memory More generally, taking into account the possibility of sets of processors, a second expression of the invention is a mechanism for regulating the flow of process state control messages between processors in a data processing system, each processor operating one or more processes, each process state control message relating to one of the processes and comprising (i) process identity data identifying that process and (ii) a process state value indicative of the state of that process; characterized in that:
the interface between the processors includes (a) one or more message address queues, each queue being operated as a first-in-first-out store, and each item in each queue comprising a process identity section which identifies one of a plurality of predetermined sets of said processes, (b) a current state random access memory having one element for each process, each element being for storing the current state of the respective process, and (c) a process pending flag memory having one or more flags for each set of processes,
the mechanism repeatedly performs the steps of:
receiving a process state control message;
writing the process state value specified by the process state control message into the element of the current state random access memory corresponding to the process identified by the process identity data of the process state control message; and
according to the state of the flags corresponding to that process, deciding whether to insert an item into one of the queues, and, if the decision is positive, (i) inserting into one of the queues an item identifying that process and (ii) updating the flags corresponding to the set including that process to indicate the existence of the item, and the mechanism generates an output message by retrieving an item from one of the queues; retrieving the state of each process in the set of processes identified by the item from the corresponding elements of the current state random access memory; using the retrieved states to generate an output message comprising the retrieved states and data identifying the set of processes; and updating the flags for that set of processes to remove the indication of the existence of the item.

Clearly the scope of the second expression of the invention broadly corresponds to that of the first expression in the case that there is only a single priority level and only a single process in each set.

The invention finds specific but not exclusive application in the field of data switching and in particular in such systems where incoming data cells comprising data and destination designation information are communicated over an interface from a network processor for storage in input queues preparatory to being transferred to destination devices over a data switch interconnecting the input queues with the destination devices and in which each input queue is administered by a flow control mechanism generating a flow control message comprising the identity and the occupancy state of the queue for communication to the network processor the flow control message being applied to the mechanism according to the invention which handles the flow control message as a process state control message the identity of the input queue corresponding to a process identity and the occupancy state corresponding to the process state value.

However, the concepts in this document are not limited to the scenario described above. They may be applied to any system (e.g. one or more devices, or sections of device(s)) which operates a number of processes, each of which has associated with it a state. This state is normally one of a number of discrete levels. The system may use the invention to communicate these states to other sections of the system which might otherwise not be able to receive the state information quickly enough.

The invention finds particular application in an interface between the network processor and the router ingress port of a system such as disclosed in our International patent application no. WO 00/38375.

BRIEF DESCRIPTION OF THE FIGURES

Embodiments of the invention will now be described for the sake of example only with reference to the accompanying figures, in which.

DETAILED DESCRIPTION OF THE EMBODIMENTS

Figure 1:
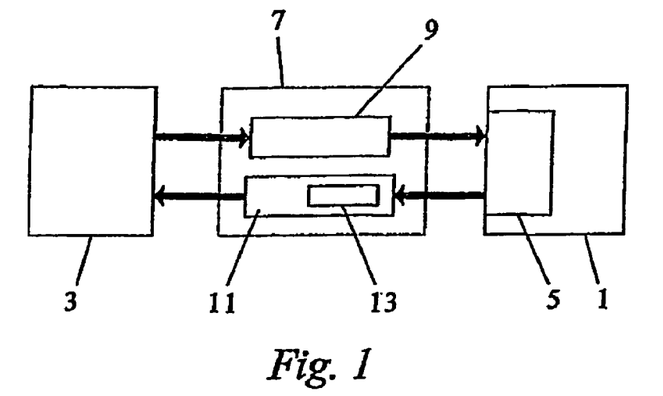
FIG. 1 illustrates schematically a system employing an embodiment of the invention.

As shown in FIG. 1, a router device 1 communicates with a network processor 3, which may be remote from the router 1 and/or owned by a third party. On the side of the router 1, communications are managed using a bus 5. The router defines one or more input queues (normally more than one, or many more than one), and receives data packets from the network processor 3 directed to specific ones of said queues The network processor 3 uses the router to communicate with a plurality of destination devices, each of which can be served by a respective one of the input queues by a switching fabric within the router 1.

Packets arriving at the bus 5 from the network processor 3 are placed in one of the series of queues. Changes in occupancy of these queues trigger the emission of flow control messages across the bus 5 to the network processor 3. These messages cause the network processor 3 to reduce or increase the flow of data packets to particular queues in the router 1.

There exist situations in which the network processor 3 cannot accept flow control messages at the rate at which the router 1 is generating them, and in such situations some mechanism is needed to "throttle" the rate of flow control messages. A typical reason why the network processor 3 is not able to take full rate flow control messages is because the network processor is optimized for high speed passage of data. The flow control messages then need to be separated from the data stream and to be passed to a separate flow control block which regulates them according to the reception capacity of the network processor 3.

This function may be carried out by a regulator according to the invention embedded within the router 1; alternatively in the system shown in FIG. 1, it is performed by a separate interface device 7 placed between the network processor 3 and the router 1, and in two-way communication with each of them. The transmission of packets to the router 1 is handled by a block 9, while communications to the network processor 3 are handled by a block 11. Within the block 11 is provided a regulator system 13 according to the invention for regulating the flow control messages to the network processor. The interface device 7 may also have other functions; for example, the block 11 may translate signals using one bus protocol into another bus protocol.

Figure 2:
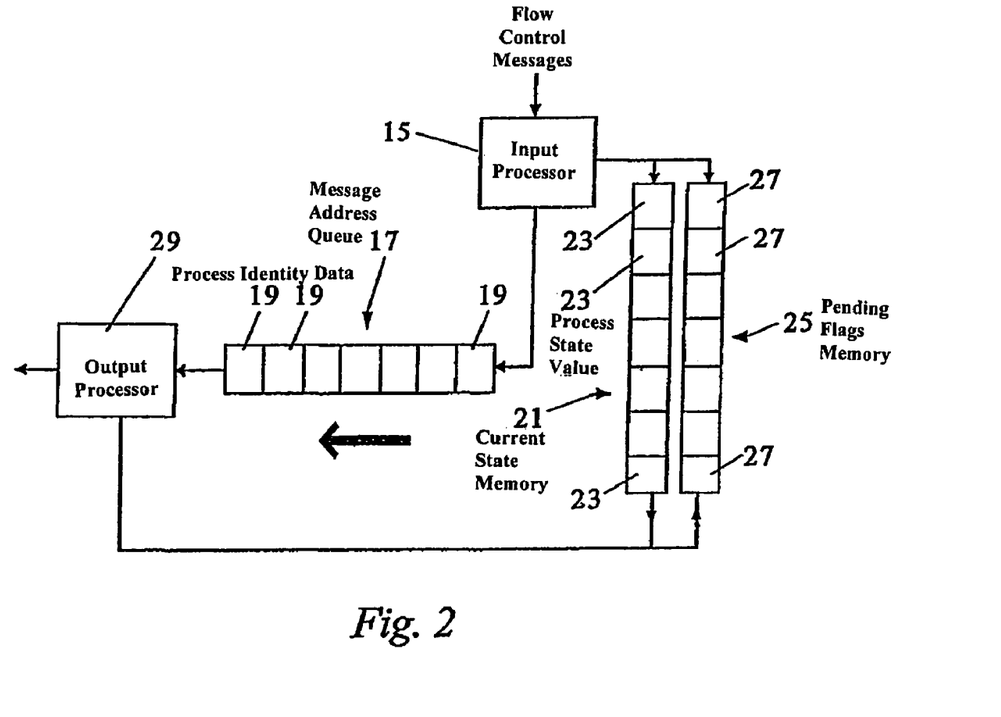
FIG. 2 shows a first embodiment of the invention.
Figure 3:
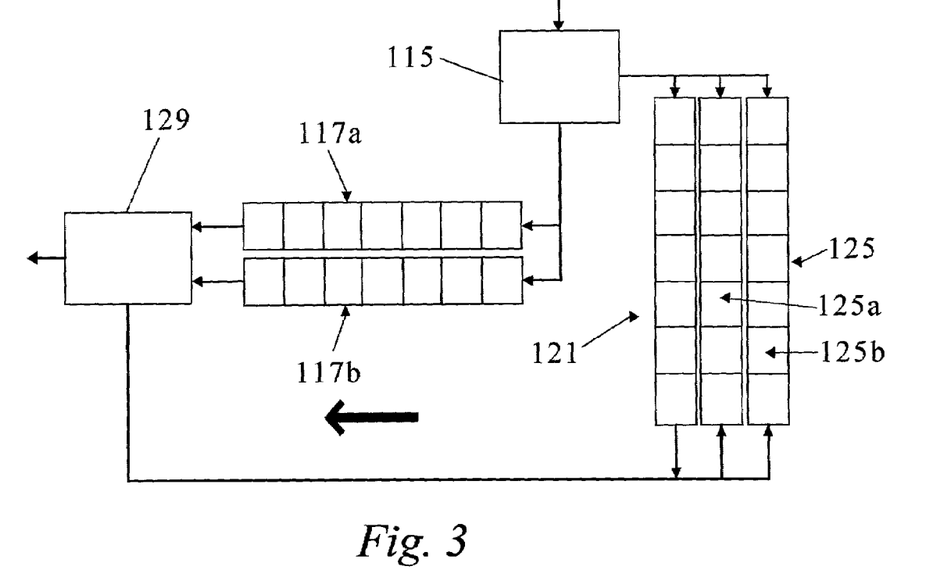
FIG. 3 shows a second embodiment of the invention.
Figure 4:
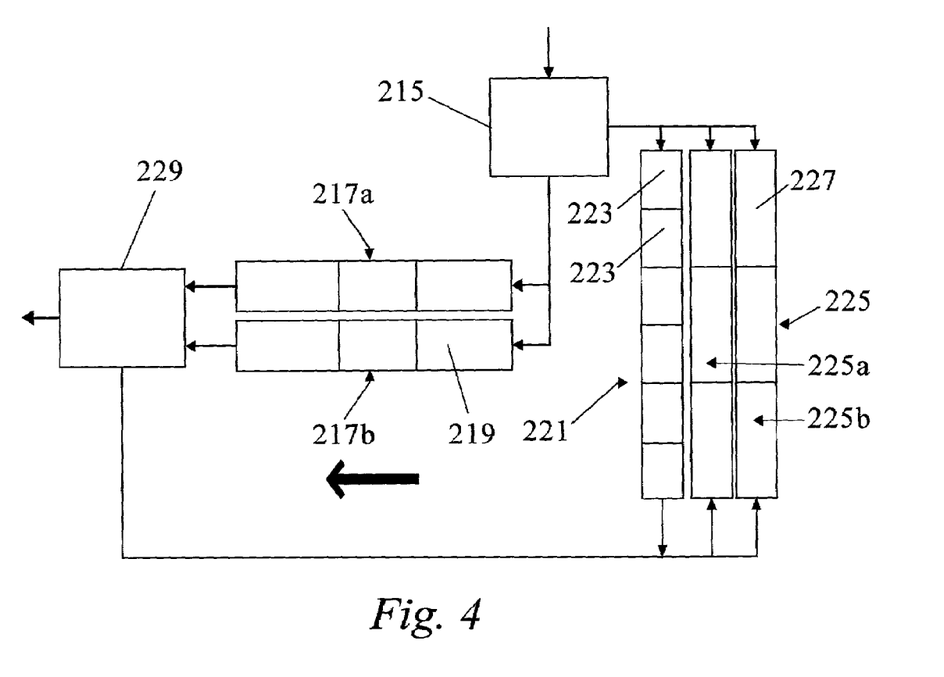
FIG. 4 shows a third embodiment of the invention.

FIGS. 2 to 4 show respective embodiments of the invention which can be employed as this regulator 13. We will use the value "Q" to represent the number of separate processes (queues) in the router 1 generating flow control information.

The embodiment of FIG. 2 consists of five sections.

Firstly, there is an input processor 15 which receives and stores incoming flow control messages.

Secondly, there is an outgoing message address queue ("OMAQ") 17, which is a first-in-first-out queue with Q elements 19 (shown schematically as Q respective squares; in FIG. 2 Q=7 is used). That is, the queue 17 is capable of storing up to Q respective items in respective elements 19. Each item includes a respective value indicating a respective queue of the router 1. Initially the queue 17 is empty.

Thirdly, there is a randomly accessible "current state" memory 21 having Q elements 23, each of which corresponds to a respective predetermined one of the router processes. The P-th element of memory 21 holds the last reported state of a predetermined P-th one of the Q processes. This register too is initially empty.

Fourthly, there is a randomly accessible "pending flags" memory 25 having Q elements 27, each of which corresponds to a respective predetermined one of the queues. Each element 27 holds a binary value (a "pending flag" or "Pf") which is 'true' (e.g. +1) in the case that the queue 17 already holds an item for the respective process, and 'false' (e.g. 0) otherwise. All the flags are initially set to 'false'.

Fifthly, there is an output processor 29 which forwards output flow control messages to the network processor 3. The output processor 29 can read from the current state register 21 and write to the pending flags memory 25.

Flow control messages enter the system (from the top of FIG. 2) via the input processor 15. Here we will label processes (router queues) by the index n (which may for example take integer values 1, . . . , Q), and label the states of each queue by index t (for example, if there are four possible states then t could take the values 0, 1, 2, 3). The values stored for process n by the respective element of the current state memory 21 and pending flag memory 25 are respectively referred to as Cs[n] and Pf[n].

When a new flow control message is input to the input processor 15, the input processor 15 sets Cs[n] equal to t—i.e. updates it to the latest known state of process n. It also examines the pending flag (Pf[n]).

If Pf[n] is presently 'false', input processor 15 inserts an item comprising the label n at the back of the outgoing message address queue 17. It then sets Pf[n] to 'true'.

On the other hand, if Pf [n] is already set to 'true', then the input processor 15 does not insert an item in the queue 17 This ensures that there is at most a single item in the queue 17 for each process, thus ensuring that the items never overflow from queue 17. When the output processor 29 removes an item from the front of the queue 17, it reads the value n from the item and obtains the current state of the process n from the current state memory 21. This ensures that the latest known state information is transmitted out of the embodiment (thus satisfying the rules above). The output processor 29 also resets the corresponding pending flag Pf[n] to 'false', thus ensuring that if any flow control messages are received in the future relating to the process n then a corresponding item will be generated in the queue 17.

The second embodiment of the invention shown in FIG. 3 permits the states to be prioritized according to a predefined number of priority levels. Elements corresponding to those of FIG. 2 are shown by reference numerals 100 higher. The queue 17 of FIG. 2 is replaced with a plurality of queues, each having Q elements and each corresponding to a respective priority level (FIG. 3 assumes there are two such levels and thus two queues 117a, 117b). For simplicity, we will assume that the number of levels of priority corresponds to the number of possible states of each router process, though —this is not essential to the invention; for example, it would be possible to have two levels of priority, a high level for state 'very full' and a lower priority for all other states. Similarly the pending flag memory 125 is partitioned into two sections 125a, 125b, each of which has Q elements and corresponds to a respective priority level. Thus, the pending flag memory 125 includes, for each process, an element (flag) for each priority level. Taking the number of priority levels to be equal to the number of states, each element of the pending flag memory 125 may be labelled Pf(n,t).

On arrival of a new incoming flow control message, which specifies that process n has state t, the input processor 115 examines the pending flags for the process n. If the pending flag for the state t, or for any higher priority state, is 'true' then element CS(n) of the current state register 121 is updated but no item is placed in the queues 117a, 117b. Otherwise, as well as updating the current state register 121, the input processor sets the pending flag Pf(n,t) to 'true' and an item placed in the queue 117a, 117b corresponding to this state.

When it is desired to generate an output flow control message, the output processor 129 determines, among those queues 117a, 117b containing at least one item, the queue corresponding to the highest level of priority, and removes the front item of that queue. The output processor 129 generates the output flow control message by reading the current state of the process specified by the item from the current state memory 121, and also updates the pending flags memory 125 to set the flag for the corresponding process and priority level to 'false'.

The effect of this mechanism is to prioritize flow control messages so that queue items relating to more important flow control messages can overtake items generated by low priority flow control messages. Since output messages are still generated from the current state memory 121, the output signal transmitted by the output processor 125 always contains up-to-date information and does not break the rules outlined above.

This mechanism implies that the set of queues 117a, 117b may each contain an item for the same process, whenever the input processor 115 receives a first flow control message relating to that process and then a higher priority flow control message relating to that process. This wastes a small amount of bandwidth, but the total size of each of the queues 117a, 117b is still limited to Q.

In the third embodiment of the invention, illustrated by FIG. 4, the Q processes are grouped into predetermined sets of N processes. For example, N=8 is advantageous, but for simplicity FIG. 4 actually shows the case of N=2 and Q=6 for 2 priority levels. Components of FIG. 4 corresponding to those of FIG. 3 are designated by reference numerals 100 higher. As before, since there are two priority levels, there are two queues 217a, 217b, but in this case each has at least Q/N elements 219 (rounded up). Likewise, the process flag register 225 is still partitioned into two sections 225a, 225b corresponding to respective priority levels, but each section only has Q/N elements 227 Each element of the process flag register 225 corresponds to a respective predetermined one of the sets of processes and a predetermined priority level, and indicates whether the queue (217a or 217b) for that priority level contains a item for any process in that set. Thus, the total number of elements in the process flag register 225 is Q/N times the number of priority levels.

When an incoming message is received by the input processor 215 specifying the state t of a given process n, the input processor 215 updates the element CS(n) of the current status memory 221, and checks the pending flags memory 225 for the set of processes including that given process. If, and only if, the pending flags memory indicates that the queue 217a, 217b of the priority corresponding to state t does not contain an item for that set of processes, and nor does any queue of higher priority, the input processor 215 generates an item indicating that set of processes and places it in the queue 217a, 217b for the priority level corresponding to state t. The input processor 215 updates the pending flag for that set of processors and that priority level, to 'true'. Thus, the maximum number of elements which can be present in any queue 217a, 217b is the number of sets of processes, i.e. Q/N rather than Q.

When it is desired to transmit an output flow control message, the output processor 229 takes an item from the front of the queue 217a, 217b of highest priority and actually containing items, and reads from the current state memory 221 the states of the entire set of processes specified by that item, generates an output flow control message specifying all these states, and updates the pending flag memory 225 for the set and priority level indicated by the item to 'false'. For some systems this might actually be easier to implement than sending status notifications for each process, as in the first and second embodiments. For example, when each process can take only two states, the states of a set of 8 processes can be transmitted in a flow control message of only a single byte.

Note that if the input processor receives two consecutive messages of the same priority for two different processors of the same set, it is possible that this will result in a single output flow control message being generated by the output processor 229. Thus, the total number of messages output from the embodiment of FIG. 4 is less on average than for the embodiments of FIGS. 2 and 3.

Examples of the Operation of the Third Embodiment

In this section examples are presented of the embodiment of FIG. 4 in the case Q=16, so the sixteen processes (router queues) are labelled by a number n which can take integer values 0, . . . 15, and N=4 (so that there are four sets: n=0 to 3; n=4 to 7; n=8 to 11 and n=12 to 15). The notation I(n, t) represents an incoming message from a process n whose state has just changed to state 't'. Pf(n, . . . , n+N−1; t) is the element of the pending flag register 225 for the set of N processes n to n+N−1 and priority t. The notation O(n, . . . , n+N−1, t, . . . ,u) represents an outgoing message concerning the set of N processes n to n+N−1, where t represents the state of process n and u represents the state of process n+N−1.

For this demonstration we separate the process of feeding flow control messages into the input processor 215 (in the sequence indicated) from the process performed by the output processor 229 generating output flow control messages. In other word, the input processor 215 is assumed to have completed its task before the output processor 229 starts. In practice, however, these processes normally happen in parallel with the outgoing process being interleaved with the incoming process. These examples are based on a system with two states (0 and 1) where state 1 is of a higher priority than state 0. At the start of each example the queues 217a (state 1), 217b (state 0) are empty, the pending flags all show 'false' and the current state is set to '0' for all queues.

1. A Simple Sequential Example

| Input message | Action by input processor 215 |
|---|---|
| I(8, 1) | Set Pf(8, . . . , 11; 1) to true |
| | Set CS(8) to 1 |
| | Generate item in queue 217a specifying set "8, 9, 10, 11" |
| I(12, 1) | Set Pf(12 . . . 15; 1) to true |
| | Set Cs(12) to 1 |
| | Generate item in queue 217a specifying set "12, 13, 14, 15" |
| I(9, 1) | Set Cs(9) to 1 |
| | Note that there is no change to Pf(8 . . . 11; 1) |
| | (it is already set to true) and no additional queue item is generated. |

| Output Message generated | Other action by processor 229 |
|---|---|
| O(8, 9, 10, 11, 1, 1, 1, 0, 0) | Set Pf(8, . . . 11; 1) to false |
| O(12, 13, 14, 15, 1, 0, 0, 0) | Set Pf(12 . . . 15; 1) to false |

This example shows the aggregation of multiple state changes in the set 8 to 11, to result in a single output message for this set.

2. A Prioritization Example

| Input message | Action by input processor 215 |
|---|---|
| I(8, 0) | Set Pf(8, . . . , 11; 0) to true |
|  | Set CS(8) to 0 |
|  | Generate item in queue 217b specifying set "8, 9, 10, 11" |
| I(12, 1) | Set Pf(12 . . . 15; 1) to true |
|  | Set Cs(12) to 1 |
|  | Generate item in queue 217a specifying set "12, 13, 14, 15" |
| Output Message generated | Other action by processor 229 |
| O(12, 13, 14, 15, 1, 0, 0, 0) | Set Pf(12 . . . 15, 1) to false |
| O(8, 9, 10, 11, 0, 0, 0, 0) | Set Pf(8, . . . 11; 0) to false |

This shows that a message for the higher priority '1' state is sent ahead of the lower priority state change.

3. An Update Example

| Input message | Action by input processor 215 |
|---|---|
| I(8, 1) | Set Pf(8, . . . , 11; 1) to true |
|  | Set CS(8) to 1 |
|  | Generate item in queue 217a specifying set "8, 9, 10, 11" |
| I(8, 0) | Set CS(8) to 0 |
|  | Note that there is no change to Pf(8 . . . 11; 0) |
|  | and no queue item is generated. |
| Output Message generated | Other action by processor 229 |
| O(8, 9, 10, 11, 0, 0, 0, 0) | Set Pf(8, . . . 11; 1) to false |

This shows that the latest known state is always transmitted. The output message was triggered based on an input flow message specifying that the state was 1, but the output message itself specifies the more recent information that the state is 0. This is because the second input message was received before the first output message was generated.

4. An Example of an Update with Reprioritization

| Input message | Action by input processor 215 |
|---|---|
| I(12, 0) | Set Pf(12 . . . 15; 0) to true |
|  | Set Cs(12) to 0 |
|  | Generate item in queue 217b specifying set "12, 13, 14, 15" |
| I(8, 0) | Set Pf(8, . . . , 11; 0) to true |
|  | Set CS(8) to 0 |
|  | Generate item in queue 217b specifying set "8, 9, 10, 11" |
| I(8, 1) | Set CS(8) to 1 |
|  | Set Pf(8, . . . 11; 1) to true |
|  | Generate item in queue 217a specifying set "8, 9, 10, 11" |
| Output Message generated | Other action by processor 229 |
| O(8, 9, 10, 11, 1, 0, 0, 0) | Set Pf(8, . . . 11; 1) to false |
| O(12, 13, 14, 15, 0, 0, 0, 0) | Set Pf(12 . . . 15; 0) to false |
| O(8, 9, 10, 11, 1, 0, 0, 0) | Set Pf(8, . . . 11; 0) to false |

This shows that the input flow control message that the state of n=8 is 1 caused an output message about set 8 to 11 to be sent before the output message relating to set 12 to 15 (although the input flow control message about process 12 entered the mechanism first). A second message concerning the set 8 to 11 message is also transmitted in this example. This message is redundant, but is not destructive since it transmits the latest information about the states of these registers. The trade-off here is that information about the state of register 8 has been transmitted early (i.e. before the information about register 12) but at the cost of extra flow control bandwidth.

Although the invention has been explained above with reference to particular embodiments, the invention is not limited in this respect, and various modifications are possible within the scope of the invention. For example, it is possible to arrange the input processor 15, 115, 215 to accept flow control messages which specify the states of a plurality of processes, like the output messages generated by the output processor 29, 129, 229. For example, the input processor could just treat these as a series of consecutive input flow control messages each relating to a single respective process.

The invention claimed is:

1. A method of regulating the flow of process state control messages for indicating the state of a corresponding process between processors in a data processing system, each processor operating one or more processes, each process state control message relating to one of the processes and comprising (i) process identity data identifying that process and (ii) a process state value indicative of the state of that process, the method being characterized by:
employing (a) a message address queue, said queue being operated as a first-in-first-out store, and each item in the queue comprising a process identity section which identifies one of the processes, (b) a current state random access memory having one element for each process, each element being for storing the current state of the respective process, and (c) a process pending flag memory having a flag for each process;

comprising repeatedly performing the steps of:
(a) receiving a process state control message;
(b) writing the process state value specified by the process state control message into the element of the current state random access memory corresponding to the process identified by the process identity data of the process state control message; and
(c) according to the state of the flag corresponding to that process, deciding whether to insert an item into the queue, and, if the decision is positive, (i) inserting into the queue an item identifying that process and (ii) updating the flag corresponding to that process to indicate the existence of the item; and further comprising repeatedly performing the steps of:
(d) retrieving an item from the queue;
(e) retrieving the current state of the process identified by the item from the element of the current state random access memory corresponding to that process;
(f) using the retrieved state to generate an output message comprising the retrieved state and data identifying that process; and
(g) updating the flag for that process to remove the indication of the existence of the item such that the output message carries the latest state information regarding that process.

2. A method of regulating the flow of process state control messages for indicating the state of a corresponding process between processors in a data processing system, each processor operating one or more processes, each process state control message relating to one of the processes and comprising (i) process identity data identifying that process and (ii) a process state value indicative of the state of that process, the method being characterized by:
employing (a) a message address queues being operated as a first-in-first-out store, and each item in the queue comprising a process identity section which identifies one of a plurality of predetermined sets of said processes, (b) a current state random access memory having one element for each process, each element being for storing the current state of the respective process, and (c) a process pending flag memory having a flag for each set of processes, comprising repeatedly performing the steps of:
(a) receiving a process state control message;
(b) writing the process state value specified by the process state control message into the element of the current state random access memory corresponding to the process identified by the process identity data of the process state control message; and
(c) according to the state of the flag corresponding to that set of process, deciding whether to insert an item into the queue, and, if the decision is positive, (i) inserting into the queue an item identifying that process and (ii) updating the flag corresponding to the set including that process to indicate the existence of the item; and further comprising repeatedly performing the steps of:
retrieving an item from the queue; retrieving the current state of each process in the set of processes identified by the item from the corresponding elements of the current state random access memory; using the retrieved states to generate an output message comprising the retrieved states and data identifying the set of processes; and updating the flag for that set of processes to remove the indication of the existence of the item.

3. A method according to claim 2 in which there are a plurality of said message address queues, each corresponding to a predetermined respective priority level associated with at least one respective process state, the number of said flags for each set of processes being equal to the number of priority levels, the item generated from a received process state control message being written into the message address queue with the priority level associated with the process state value of the process state control message, and the existence of the item being specified by the pending flag corresponding to that priority level.

4. A method according to claim 2 in which each said set of processes includes a plurality of processes.

5. A method of communicating data cells comprising data and destination designation information over an interface from a network processor to destination devices, the method comprising receiving the data cells, defining input queues for storing the data cells, and using a data switch to interconnect the input queues with the destination devices, each input queue being administered by a flow control mechanism generating flow control messages comprising the identity and the occupancy state of the input queue for communication to the network processor, the method further comprising regulating the flow of said flow control messages by a method according to claim 1, the flow control messages corresponding to the process state control messages, and for each flow control message the identity of the input queue corresponding to the process identity data of the process state control message and the occupancy state corresponding to the process state value of the process state control message.

6. A regulation device for regulating the flow of process state control messages for indicating the state of a corresponding process between a plurality of processors in a data processing system in which each processor operates one or more processes, and each process state control message relates to one of the processes and comprises (i) process identity data identifying that process and (ii) a process state value indicative of the state of that process, the device being characterized by comprising:
(a) means defining a message address queue, said queue being operated as a first-in-first-out store, and each item in the queue comprising a process identity section, which identifies one of the processes;
(b) a current state random access memory having one element for each process, each element being for storing the current state of the respective process;
(c) a process pending flag memory having a flag for each process;
(d) an input processor arranged to
receive a process state control message,
write the process state value specified by the process state control message into the element of the current state random access memory corresponding to the process identified by the process identity data of the process state control message, and
according to the state of the flag corresponding to that process, decide whether to insert an item into the queue, and, if the decision is positive, (i) insert into the queue an item identifying that process and (ii) update the flag corresponding to that process to indicate the existence of the item; and
(e) an output processor arranged to retrieve an item from the queue, retrieve the state of the process identified by the item from the element of the current state random access memory corresponding to that process, use the retrieved state to generate an output message comprising the retrieved state and data identifying that process, and update the flag for that process to remove the indication of the existence of the item such that the output message carries the latest state information regarding that process.

7. A regulation device for regulating the flow of process state control messages for indicating the state of a corresponding process between a plurality of processors in a data processing system in which each processor operates one or more processes, and each process state control message relates to one of the processes and comprises (i) process identity data identifying that process and (ii) a process state value indicative of the state of that process, the device being characterized by including:
(a) means defining a message address queue being operated as a first-in-first-out store, and each item in the message address queue comprising a process identity section which identifies one of a plurality of predetermined sets of said processes;
(b) a current state random access memory having one element for each process, each element being for storing the current state of the respective process;
(c) a process pending flag memory having a flag for each set of processes;

(d) an input processor arranged to: receive a process state control message;
write the process state value specified by the process state control message into the element of the current state random access memory corresponding to the process identified by the process identity data of the process state control message; and
according to the state of the flags corresponding to that process, decide whether to insert an item into one of the queues, and, if the decision is positive, (i) insert into the message address queue an item identifying that process and (ii) update the flag corresponding to the set including that process to indicate the existence of the item; and
(e) an output processor arranged to retrieve an item from one of the message address queues; retrieve the current state of each process in the set of processes identified by the item from the corresponding elements of the current state random access memory; use the retrieved states to generate an output message comprising the retrieved states and data identifying the set of processes; and update the flags for that set of processes to remove the indication of the existence of the item such that the output message carries the latest state information regarding that process.

8. A device according to claim 7 in which there are a plurality of said message address queues, each corresponding to a predetermined respective priority level associated with at least one respective process state, the number of said flags for each set of processes being equal to the number of priority levels, the input processor being arranged to generate the item from a received process state control message, place it in the queue with the priority level associated with the process state value of the process state control message, and specify the existence of the item by updating the pending flag corresponding to that priority level.

9. A device according to claim 7 in which each said set of processes includes a plurality of processes.

10. A switching system arranged to communicate data cells comprising data and destination designation information over an interface from a network processor to destination devices, the switching system comprising means for receiving the data cells, means for defining input queues for storing the data cells, and a data switch for interconnecting the input queues with the destination devices, each input queue being administered by a flow control mechanism generating flow control messages comprising the identity and the occupancy state of the input queue for communication to the network processor, the switching system further comprising a regulation device according to claim 6, the flow control messages being transmitted to the regulation device as process state control messages, for each flow control message the identity of the input queue corresponding to the process identity data of the process state control message and the occupancy state corresponding to the process state value of the process state control message, the regulation device transmitting output messages to the network processor.

11. A method of communicating data cells comprising data and destination designation information over an interface from a network processor to destination devices, the method comprising receiving the data cells, defining input queues for storing the data cells, and using a data switch to interconnect the input queues with the destination devices, each input queue being administered by a flow control mechanism generating flow control messages comprising the identity and the occupancy state of the input queue for communication to the network processor, the method further comprising regulating the flow of said flow control messages by a method according to claim 2, the flow control messages corresponding to the process state control messages, and for each flow control message the identity of the input queue corresponding to the process identity data of the process state control message and the occupancy state corresponding to the process state value of the process state control message.

12. A method of communicating data cells comprising data and destination designation information over an interface from a network processor to destination devices, the method comprising receiving the data cells, defining input queues for storing the data cells, and using a data switch to interconnect the input queues with the destination devices, each input queue being administered by a flow control mechanism generating flow control messages comprising the identity and the occupancy state of the input queue for communication to the network processor, the method further comprising regulating the flow of said flow control messages by a method according to claim 3, the flow control messages corresponding to the process state control messages, and for each flow control message the identity of the input queue corresponding to the process identity data of the process state control message and the occupancy state corresponding to the process state value of the process state control message.

13. A method of communicating data cells comprising data and destination designation information over an interface from a network processor to destination devices, the method comprising receiving the data cells, defining input queues for storing the data cells, and using a data switch to interconnect the input queues with the destination devices, each input queue being administered by a flow control mechanism generating flow control messages comprising the identity and the occupancy state of the input queue for communication to the network processor, the method further comprising regulating the flow of said flow control messages by a method according to claim 4, the flow control messages corresponding to the process state control messages, and for each flow control message the identity of the input queue corresponding to the process identity data of the process state control message and the occupancy state corresponding to the process state value of the process state control message.

14. A method of regulating flow of process state control messages for indicating a state of a corresponding process between processors in a data processing system operating one or more processes, the method comprising the steps of:
employing (a) a message address queue operated as a first-in-first-out store for a plurality of items, each item in the message address queue comprising a process identity section which identifies one of the processes, (b) a current state random access memory having an element for each process, each element being for storing a current state of the respective process, and (c) a process pending flag memory having a process pending flag for each process;
receiving a process state control message including process identity data identifying a respective process and a process state value indicative of a state of the respective process;
writing the process state value specified by the process state control message into an element of the current state random access memory corresponding to the process identified by the process identity data of the process state control message; and deciding whether to insert an item into the message address queue responsive to a state of the process pending flag corresponding to that process, and, if the decision is positive, (i) inserting into the message address queue the item identifying that process and (ii) updating the process pending flag corresponding to that process to indicate the existence of the item.

15. A method according to claim 14, the method further comprising repeatedly performing the steps of:
retrieving an item from the message address queue;
retrieving the current state of the process identified by the item from the element of the current state random access memory corresponding to that process so that an output message carries the latest state information regarding that process;
using the retrieved state to generate the output message comprising the retrieved current state and data identifying that process; and
updating the process pending flag for that process to remove the indication of the existence of the item in the message address queue.

16. A method according to claim 14 in which there are a plurality of said message address queues, each corresponding to a predetermined respective priority level associated with at least one respective process state, a number of said pending process flags for each process being equal to the number of priority levels, the item generated from a received process state control message being written into the message address queue with the priority level associated with the process state value of the process state control message, and the existence of the item being specified by the pending flag corresponding to that priority level.

17. A method of regulating flow of process state control messages for indicating a state of a corresponding process between processors in a data processing system operating one or more processes, the method comprising the steps of:
employing (a) a message address queue operated as a first-in-first-out store for a plurality of items, each item in the message address queue comprising a process identity section which identifies one of a plurality of predetermined sets of the processes, (b) a current state random access memory having an element for each process, each element being for storing a current state of the respective process, and (c) a process pending flag memory having one or more process pending flags for each set of process;
receiving a process state control message including process identity data identifying a respective process and a process state value indicative of a state of the respective process;
writing the process state value specified by the process state control message into an element of the current state random access memory corresponding to the process identified by the process identity data of the process state control message; and
deciding whether to insert an item into one of the message address queue responsive to a state of the process pending flag corresponding to that process, and, if the decision is positive, (i) inserting into the message address queue the item identifying that process and (ii) updating the process pending flag corresponding to that process to indicate the existence of the item.

18. A method according to claim 17, the method further comprising repeatedly performing the steps of:
retrieving an item from the message address queue;
retrieving the current state of each process in the set of processes identified by the item from the corresponding elements of the current state random access memory so that an output message carries the latest state information regarding each process in the set of processes;
using the retrieved state to generate the output message comprising the retrieved current states and data identifying the set of processes; and
updating the process pending flag for the set of process to remove the indication of the existence of the item in the message address queue.

19. A method according to claim 17 in which there are a plurality of said message address queues, each corresponding to a predetermined respective priority level associated with at least one respective process state, a number of said pending process flags for each set of processes being equal to a number of priority levels, the item generated from a received process state control message being written into the message address queue with the priority level associated with the process state value of the process state control message, and the existence of the item being specified by the pending flag corresponding to that priority level.

* * * * *